(12) United States Patent
Cruz Serna et al.

(10) Patent No.: US 8,741,372 B2
(45) Date of Patent: Jun. 3, 2014

(54) TRANS-FREE FAT BASE FOR APPLICATION IN FILLING CREAMS

(75) Inventors: Adriana Fernanda Cruz Serna, Bogotá (CO); Efrain Daza González, Bogotá (CO)

(73) Assignee: Team Foods Colombia S.A. (CO)

( * ) Notice: Subject to any disclaimer, the term of this patent is extended or adjusted under 35 U.S.C. 154(b) by 368 days.

(21) Appl. No.: 13/054,682

(22) PCT Filed: Jul. 15, 2008

(86) PCT No.: PCT/IB2008/001854
§ 371 (c)(1),
(2), (4) Date: Apr. 8, 2011

(87) PCT Pub. No.: WO2010/007458
PCT Pub. Date: Jan. 21, 2010

(65) Prior Publication Data
US 2011/0177227 A1 Jul. 21, 2011

(51) Int. Cl.
*A23D 9/02* (2006.01)
(52) U.S. Cl.
USPC .............................. 426/601; 426/606; 426/607
(58) Field of Classification Search
USPC ........................................................ 426/601
See application file for complete search history.

(56) References Cited

U.S. PATENT DOCUMENTS

| 3,244,536 A | 4/1966 | Kidger |
| 4,214,012 A | 7/1980 | Ainger et al. |
| 4,711,788 A | 12/1987 | Porcello et al. |
| 4,826,696 A | 5/1989 | Wilson et al. |
| 4,834,991 A | 5/1989 | Porcello et al. |
| 5,529,800 A * | 6/1996 | Bourns et al. ................. 426/572 |
| 6,146,672 A * | 11/2000 | Gonzalez et al. ............... 426/94 |
| 7,618,670 B2 * | 11/2009 | Ullanoormadam ........... 426/607 |

FOREIGN PATENT DOCUMENTS

| EP | 1 862 077 A1 | 5/1997 |
| EP | 1 552 751 A1 | 7/2005 |
| WO | 97/16978 A1 | 5/1997 |
| WO | 03/080779 A1 | 10/2003 |
| WO | 2005/122777 A2 | 12/2005 |
| WO | 2008/030173 A1 | 3/2008 |

OTHER PUBLICATIONS

Berger, K. G. 2005. JAOCS 82(11)775.*
Nor Aini, I. et al. 1999. JAOCS 76(5)643.*
Lida, H. et al. 1998. JAOCS 75(11)1625.*
Traitler, H. et al. 1985. JAOCS 62(2)1985.*
Kheiri, M. 1985. JAOCS 62(2)410.*
J Eung Hee Lee, et al; "Preperation of interesterified Plastic Fats from Fats and Oils Free of *Trans* Fatty Acid", J. Agric. Food Chem. 2008, 56, 4039-4046.
International Search Report: PCT/IB2008/001854.

* cited by examiner

*Primary Examiner* — Carolyn Paden
(74) *Attorney, Agent, or Firm* — Barry J. Schindler; Greenberg Traurig, LLP

(57) ABSTRACT

A fat base is described comprising a mixture containing from 4 to 20% C12:0 lauric acid, preferentially from 5 to 17%, from 30 to 50% C16:0 palmitic acid, preferentially from 34 to 45%, and 4 to 10% C18:0 stearic acid, preferentially from 4.5 to 7.5%, and from 20 to 40% C18:1 oleic acid, preferentially from 25 to 35%, the balance being a mixture of other C4:0 to C22:0 fatty acids, having application, for example, as filling for wafer biscuits.

3 Claims, 1 Drawing Sheet

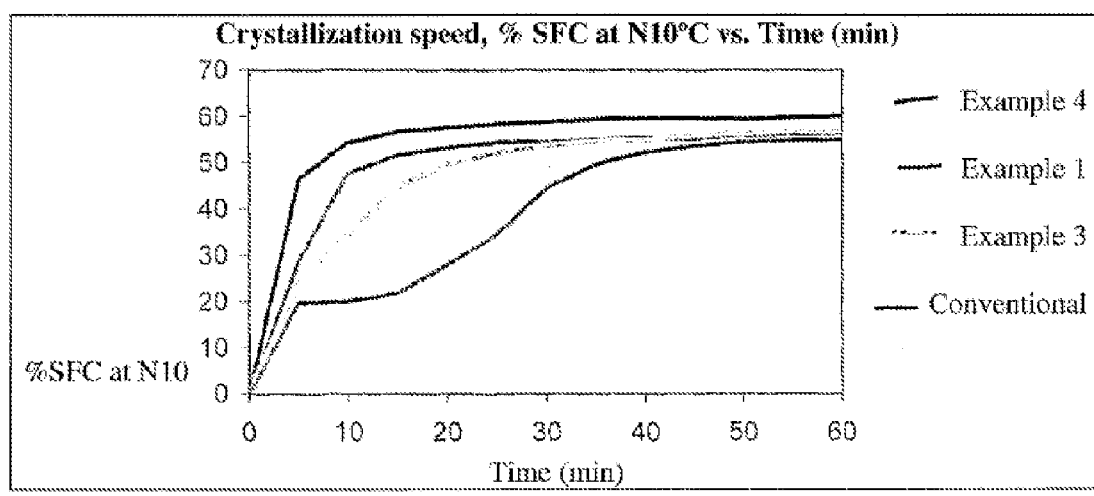

TRANS-FREE FAT BASE FOR APPLICATION IN FILLING CREAMS

FIELD OF INVENTION

The present invention is related to a special mixture that consists mainly of triglycerides, is free of trans-fatty acids, and has texture, crystallization, performance and fusion characteristics to the palate that are adequate for preparing filling creams for different uses in bread, cookie, confectionery and chocolate making.

INVENTION PRECEDENTS

In recent years it has been common practice to use partially-hydrogenated products such as partially-hydrogenated palm oil, partially-hydrogenated soybean oil, and partially-hydrogenated palm kernel oil, for various industrial uses. This has the drawback that these fats have a high content of trans-fatty acids, deemed unhealthy due to their role in increased levels of LDL cholesterol and in lower levels of HDL cholesterol. U.S. Pat. No. 3,244,536 (Kidger, 1966), for example, describes a traditional process for making of cookie filling where the fatty phase consists of two sources of interesterified fats. The first is a partially hydrogenated source, preferably beef or pork tallow, high in stearic acid content; the second is a source rich in lauric acid, from palm and palm kernel oils, although they are referring to a product with good mouth feel and good shelf life this is a partially-hydrogenated product not trans-fat free, not cholesterol free (animal fats), and there is no reference to the products' crystallization rate during its use.

U.S. Pat. No. 4,214,012 (Ainger) describes a fat blend for use in confectionery and cookie fillings, having rapid palate fusion, achieved through intersterified blend of oils of lauric acid origin, mainly palm kernel OLEINA, and oils of non-lauric acid origin, mainly from palm oil fractions that eventually could be partially or completely hydrogenated. Nonetheless, these mixtures usually have a higher content of the lauric acid source, creating a higher content of saturated fats and with a range different to that of the invention. Additionally, there is no reference to the trans-fatty acid content, which in partially-hydrogenated alternatives would not be trans-free. This product makes no mention of the addition of emulsifiers, or of the product's crystallization rate during use.

U.S. Pat. No. 4,711,788 (Porcello, 1987) describes a cookie cream where the fat base consists mainly of a blend of partially-hydrogenated soybean, cottonseed, and palm kernel oils and others, preferably fractioned, where emphasis is made on rapid palate fusion. Since this fat base is also partially-hydrogenated, it makes no emphasis on being trans-free, nor makes reference to the product's crystallization speed.

U.S. Pat. No. 4,826,696 (Wilson, 1989) describes a fat system with good stability in a temperature range of 10-32° C., and unnoticeable solids at 37° C. This fat system features a plastic fat phase consisting of partially-hydrogenated oils, mainly soybean and cottonseed oils intersterified with palm kernel oil/olein, and a highly stable oxidative phase consisting of partially-hydrogenated and fractioned soybean and/or cottonseed oil. This fat phase, although it highlights low serosity at body temperature, is not trans-fat free, as it uses partially-hydrogenated oils, and does not mention crystallization rate during use of the product.

U.S. Pat. No. 4,834,991 (Porcello, 1989) makes reference to a cookie filling cream where the main fat base consists of soybean oil, with rapid palate fusion. The fat base has a specific solids profile, where the fat base is partially-hydrogenated soybean and palm kernel oils preferably, fractioned and esterified. Eventually, the fat base can also contain coconut oil or oils from palm and cottonseed. This base can eventually contain an addition of emulsifiers, mainly polyglycerol stearates. This cookie cream, with improved fusion speed, mainly contains partially-hydrogenated fats which are not trans-fat free, and does not mention crystallization rate during use of the product.

These products, although they perform well in regards to sensation, have, in practice, harmful effects on the health of those people who consume them. Additionally, due to new regulations regarding product labeling where it is necessary to declare trans-fatty acid content per serving, there is pressing need to use products with very low trans-fat content or without any in order to create competitive products. Although a series of alternative products are being developed in the market, with low levels or devoid of trans-fatty acids, these are based on palm and its fractions, which have low crystallization speeds and inadequate waxen oral behavior. In practice, this makes these products far from ideal for filling creams.

Due to this, new alternatives are being developed for use in food products. International Patent PCT/BE03/00055 from Fuji Oil Europe, for example, is related to the production of low trans-fatty acid fats for confectionery and bread making, used in fillings of non-lauric origin, mainly from palm oil and its fractions, and using fractioning and hydrogenation processes where the trans-fatty acid content is up to 15%. Nonetheless, and even though this invention shows a fat base made from palm oil with fractioning and partial hydrogenation processes, and with an acceptable crystallization speed and adequate mouth feel, the fat base of this invention has a very different makeup of triglycerides and fatty acids when compared to those in the present invention. It also shows a minimum trans-fat percentage of 3.6%, which does not make it trans-fat free.

One the other hand, Patent PCT/SE2007/050592 by Aarhus Karlshamm of Sweden, describes a blend of trans-fat free triglycerides, based in stearic and lauric acids, for use in dairy whipped cream. Here the intent is to replace the fat phase in a natural dairy cream with this product. The use of this product is limited to this specific use, and it is based in a high content of lauric acid from hydrogenated and intersterified palm kernel oil mainly. The makeup of this fat base is different to the present invention, featuring a percentage of saturates higher than 84%, and it does not show a crystallization speed similar to the present invention and, although the oral behavior is adequate, it is designed for other uses (whipped dairy creams used for cake decoration, toppings.)

BRIEF SUMMARY OF THE INVENTION

The present invention is related to a trans-fatty acid free fat base consisting mainly of triglycerides generated thought fractioning of intersterified palm and palm kernel oils, with further addition of a blend of emulsifiers, which allow for the characteristics required for production of a filling cream, for use in cookie, bread, confectionery and chocolate making.

In one form, the present invention provides a trans free fat base with crystallization characteristics that provide the filling cream with performance in its use, adherence and appropriate texture, which allow for an excellent mouth feel.

The present invention provides a trans-fat free fat base, which has the advantage of a crystallization speed appropriate for its use in high speed production lines of wafer cookies, preventing the wafers or layers from moving when cut.

The present invention also provides a trans-fat free fat base which, due to the intersterification process and its specific fatty acid makeup, guarantees a product with very good crystallization properties and oxidation stability and for different filling uses.

The objectives and additional advantages of the present invention will become more evident in the description of the illustrations, in the detailed description of the invention and claims.

BRIEF DESCRIPTION OF THE DRAWING

FIG. 1 shows the crystallization speed shown as % SFC at N10 degrees Celsius vs. time in minutes for each of Examples 1, 3, and 4 and a conventional trans-fat isomers free fat base from palm oil and/or its fractions.

DESCRIPTION OF INVENTION'S PREFERRED FORM

The invention refers to fat base free of trans isomers, and which has good palate fusion, low serosity according to an expert panel and rapid crystallization speed during use. The latter is measured through its solid content (NMR) at 10° C., which after 10 minutes of crystallization is between 35-60% of solid content, and after 20 minutes of crystallization has a solid content between 45-65% at 10° C.

The invention also refers to a fat base consisting of a blend containing from 4 to 20% lauric acid C12:0, preferably between 5 and 17%, of 30 to 50% palmitic acid C16:0, preferably between 34 to 45%, and 4 to 10% of stearic acid C18:0, preferably between 4.5 and 7.5% and between 20 and 40% of oleic acid C18:1, preferably between 25 and 35%. The remainder is a blend of other fatty acids from C4:0 to C22:0.

The blend must have a lauric acid content below 20%, which is reorganized randomly through intersterification with other fatty acids, in order to obtain the desired product.

The total fat composition of this invention may contain one or more of the following oils: coconut oil, palm kernel, pal, soybean, cotton, sunflower, colza, canola, olive and corn.

These intersterified oils may or may not be mixed with palm oil and its fractions and/or fully-hydrogenated vegetable oils to achieve an adequate solid profile and fusion point that guarantees the product's good performance.

Using the IUPAC 2.150a method, the characteristic curve of the solids profile of this fat base must be within the following ranges:
N10 is a range between 50 and 80%, preferably between 55 and 72%,
N20 is a range between 30 and 50%, preferably between 35 and 48%,
N30 is a range between 10 and 20%, preferably between 14 and 18%,
N35 is a range between 5 and 15%, preferably between 6 and 10%,
N40 is lower than 5%, preferably lower than 3%.

The above guarantees that the fusion points are between 30 and 45° C. Also, the solid N20, N30 guarantees good crystallization and adherence of the product. The solid N35, and N40 gives the product good palate fusion characteristics with low serosity.

Additionally, this fat base features a blend that may contain one or more of the following emulsifiers: saturated and unsaturated mono-diglycerides, lecithin, polysorbates, propylene glycol stearates, sorbitan stearates, polyglycerol stearates, lactylated stearates, ethoxilated stearates, which provide the final product with a better performance upon air contact, improving the cream's texture and extending the duration of these characteristics.

The proportion used for the above emulsifiers is maximum 5%.

A simple blend used in these types of uses is the one found in the palm and palm stearine blends with fusion points around 44° C., and with a N20 solid profile between 30 and 40, N30 between 12 and 20, N40 between 6 and 10. This product shows good stability at high temperatures but has a mouth feel that is too serous, poor air incorporation and slow crystallization. Because of this, a development was carried out where palate fusion, airing were improved, in order to obtain the product of the invention.

The process for obtaining the fat base is characterized by the following stages:
Fractioning of palm oil to obtain a stearine with a iodine value between 35 and 42,
Blend, in a proportion between 70 and 80% of palm stearine and 20 to 30% palm kernel oil and/or its liquid fractions,
Perform a chemical intersterification with sodium methoxide to redistribute the fatty acids in a random form and thus modify the solids curve, the fusion point and the crystallization properties,
Blend the intersterified product with fractions from palm oil or hydrogenated or non-hydrogenated palm kernel oil, in order to obtain the fatty acid content mentioned in claim 1,
Add emulsifiers.

Below there are a few examples of the fat bases where the invention's characteristics can be seen:

Example 1

Intersterified blend of palm stearine and palm kernel oil using sodium methoxide as catalyst, with a later addition of palm oil and emulsifiers.

A blend of 70% palm stearine and 30% palm kernel oil was made and subject to the intersterification process with sodium methoxide, creating a random redistribution of the fatty acids, which resulted in the following profile:

| | |
|---|---|
| N10 | 68% |
| N20 | 47% |
| N30 | 18% |
| N40 | 2% |

Fusion point 38° C.

A blend of emulsifiers of the mono- and diglyceride with polysorbate type was added to this fat base. Subsequent usage trials in filling creams were carried out, using the basic formula of 30% fat and 70% powdered sugar, and using the whipping process to add air, resulting in good product performance in airing and adherence to the cookies.

See table 1 and graph 1.

Example 2

Intersterified blend of palm stearine and palm kernel oil using sodium methoxide as catalyst, with a later addition of palm oil and emulsifiers.

A blend of 70% palm stearine and 30% palm kernel oil was made and subject to the intersterification process with sodium methoxide, creating a random redistribution of the fatty acids, which resulted in the following profile:

| | |
|---|---|
| N10 | 68% |
| N20 | 47% |
| N30 | 18% |
| N40 | 2% |

Fusion point 38° C.

Afterwards, 20% palm oil and emulsifiers of the mono- and diglyceride and polysorbate type at a total level of 1.1% were added to the product. The result was a product with a solid profile as described below:

| | |
|---|---|
| N10 | 59% |
| N20 | 32% |
| N30 | 13% |
| N40 | 1.3% |

Fusion point 36.6° C.

The resulting fatty acid profile has the following composition:

| | |
|---|---|
| C12 | 8.1% |
| C16 | 41.5% |
| C18 | 4.8% |
| C18:1 | 32.7% |
| Others | 12.9% |

Afterwards, this fat base was used to prepare a filling cream using the basic formula of 30% fat and 70% powdered sugar, and using the whipping process to add air. This cream showed excellent mouth feel performance when compared to one made from palm oil-based products.

See table 1.

Example 3

Intersterified blend of palm stearine and palm kernel oil using sodium methoxide as catalyst, with a later addition of palm oil and emulsifiers.

A blend of 70% palm stearine and 30% palm kernel oil was made and subject to the intersterification process with sodium methoxide, creating a random redistribution of the fatty acids, which resulted in the following profile:

| | |
|---|---|
| N10 | 68% |
| N20 | 47% |
| N30 | 18% |
| N40 | 2% |

Fusion point 38° C.

Afterwards, 38% palm and 13% palm stearine were added to this product to achieve the following solids curve:

| | |
|---|---|
| N10 | 58.6% |
| N20 | 36.2% |
| N30 | 16.5% |
| N40 | 3.7% |

Fusion point 38° C.

Afterwards, emulsifiers of the mono- and diglyceride and polysorbate type at a total level of 1.1% were added to the product.

The resulting fatty acid profile has the following composition:

| | |
|---|---|
| C12 | 5.1% |
| C16 | 43.3% |
| C18 | 5.0 |
| C18:1 | 34.2% |
| Others | 12.3% |

As before, a filling cream doe cookies was prepared using the basic formula of 30% fat and 70% powdered sugar, and using the whipping process to add air, and good adherence and good thermal stability were achieved without affecting its mouth feel.

See table 1 and graph 1.

Example 4

Intersterified blend of palm stearine and palm kernel oil using sodium methoxide as catalyst, with a later addition of palm oil and emulsifiers.

A blend of 70% palm stearine and 30% palm kernel oil was made and subject to the intersterification process with sodium methoxide, creating a random redistribution of the fatty acids, which resulted in the following profile:

| | |
|---|---|
| N10 | 68% |
| N20 | 47% |
| N30 | 18% |
| N40 | 2% |

Fusion point 38° C.

Afterwards, 20% of fully-hydrogenated palm kernel oil was added, as well as emulsifiers of the mono, diglyceride and polysorbate type at a total level of 3.5%, resulting in the following solids profile:

| | |
|---|---|
| N10 | 70.5% |
| N20 | 44.3% |
| N30 | 14.6% |
| N40 | 1.4% |

Fusion point 39° C.

The resulting fatty acid profile has the following composition:

| | |
|---|---|
| C12 | 16.6% |
| C16 | 34.9% |
| C18 | 8.1% |
| C18:1 | 26.1% |
| Others | 14.8% |

A wafer cream was prepared with 70% powdered sugar and 30% of the fat base in this example, resulting in a product with good airing qualities and palate fusion characteristics. This cream was applied to wafer layers, proceeding to cut the cookies to observe crystallization and adherence to the layers. The result was a stable filling in the cookie that did not move during the cutting.

See table 1 and graph 1.

Example 5

Intersterified blend of palm stearine and palm kernel oil using sodium methoxide as catalyst, with a later addition of palm oil and emulsifiers.

A blend of 70% palm stearine and 30% palm kernel oil was made and subject to the intersterification process with sodium methoxide, creating a random redistribution of the fatty acids, which resulted in the following profile:

| | |
|---|---|
| N10 | 68% |
| N20 | 47% |
| N30 | 18% |
| N40 | 2% |

Fusion point 38° C.

Afterwards, 10% palm kernel oil and a 3.5% blend of emulsifiers of the mono and diglyceride type with polysorbate type were added to this product, resulting in the following solids profile:

| | |
|---|---|
| N10 | 61.1% |
| N20 | 35.2% |
| N30 | 11.4% |
| N40 | 0.2% |

Fusion point 37.5° C.

Fatty Acid Profile

| | |
|---|---|
| C12 | 16.3% |
| C16 | 34.6% |
| C18 | 4.1% |
| C18:1 | 30.2% |
| Others | 14/8% |

This product was tested in creams for wafer type cookies, and the result was rapid palate fusion and good crystallization and airing at the time of applying to the wafer layers.

See table 1.

The following table (Table 1), shows the results obtained from the performance and sensory trials of the examples described above, in contrast to a conventional trans-fat isomers free fat base from palm oil and/or its fractions, which is more waxen and adds less air.

TABLE 1

Creams made with the different examples of the invention, contrasted to a cream made from a conventional cream fat from palm oil and/or its fractions.

| Product/property | Conventional trans-fat free cream palm and fractions base | Example 1 | Example 2 | Example 3 | Example 4 | Example 5 |
|---|---|---|---|---|---|---|
| Density-5 min | 0.82 | 0.86 | 0.86 | 0.86 | 1.02 | 0.87 |
| Density 10 min | 0.81 | 0.79 | 0.78 | 0.79 | 0.78 | 0.78 |
| Density-15 min | 0.82 | 0.79 | 0.78 | 0.79 | 0.78 | 0.78 |
| Density 20 min | 0.82 | 0.80 | 0.79 | 0.79 | 0.78 | 0.77 |
| Density-25 min | 0.82 | 0.82 | 0.79 | 0.79 | 0.78 | 0.77 |
| Density-30 mn | 0.82 | 0.82 | 0.8 | 0.79 | 0.78 | 0.78 |
| Palate fusion* | 2.5 | 3.5 | 4.0 | 3.5 | 4.0 | 4.0 |
| Waxen* | 3.5 | 3.0 | 2.5 | 2.5 | 2.0 | 1.5 |

*Palate fusion scale: 5 very fast fusion speed 1 very slow speed
*Waxen scale: 5 too waxen 1 low waxen In FIG. 1, the crystallization speed of some of the fat bases from the invention examples can be observed, as well as their behavior in contrast to a conventional trans-fat isomers free fat base from palm oil and/or its fractions.

To achieve these speeds of crystallization, samples were taken from each fat base and placed in glass tubes used for SFC solids content measurement thought Nuclear magnetic resonance NMR. Each tube was subject to 60° C. for 5 minutes to erase crystal memory, afterwards placing the tubes in a thermostatic bath at 10° C. A reading of the SFC solids content was done in a NMR Minispec Bruker System every 5 minutes, graphing the percentages obtained versus time by 1 hour. The difference in speed of crystallization was clearly observed in these trans-fat isomers free fat bases in contrast to a conventional trans-fat isomers free fat base from palm oil and/or its fractions. As can be seen in the graph, crystallization speeds at 10 minutes were at 54% for example 4, 48% for example 1 and 35% for example 3, in contrast with the conventional fat base of from palm, with 20% solids at 10 min; at 20 minutes of crystallization, values were 58% for example 4, 53% for example 1 and 50% for example 3 versus 27% solids for the conventional palm product. Noticeable differences can be observed, as can be seen in the graph, for the remaining times, mainly until 40 minutes.

It will be evident for an expert in the technique that various substitutions and modifications can be made to the above-described invention, without deviating from its reach and spirit. The invention here described can be adequately put into practice in absence of any element or elements, limitation or limitations that are not specifically described here. The terms and expressions here used have been utilized as terms and expression within the description and do not pretend to limit in any way the invention, but it is acknowledged that various modifications are possible within the scope of the invention. Thus, it must be understood that although the present invention has been shown through different specific forms, and optional characteristics, modifications and variations of the concepts here described can be done by a person with some knowledge of the subject. Such modifications and variations will be considered within the scope of this invention.

Having described the invention as ANTECEDE, the content of the following is declared as property.

What is claimed is:

1. A process, comprising:
producing a trans-fat isomers free fat base comprising:
fractioning palm oil to obtain a palm stearine with an iodine value between 35 and 42;
blending 70 and 80% of the palm stearine and 20 to 30% palm kernel oil and/or palm kernel liquid fractions to form a first blended product;
performing a chemical interesterification on the first blended product using sodium methoxide sufficiently so as to:
redistribute fatty acids in the first blended product in a random form,
modify:
(i) a solids curve of the first blended product,
(ii) a fusion point of the first blended product and
(iii) crystallization properties of the first blended product, and form an interesterified product;
blending the interesterified product with fractions from palm oil or hydrogenated or non-hydrogenated palm kernel oil sufficiently so as to result in a second blended product containing:
i) 4 to 20% lauric acid C12:0,
ii) 30 to 50% palmitic acid C16:0,
iii) 4 to 10% of stearic acid C18:0,
iv) 20 to 40% of oleic acid C18:1, and
v) a remainder of other fatty acids C4:0 to C22:0; and
adding emulsifiers to the second blended product to form the trans-fat isomers free fat base.

2. A trans-fat isomers free fat base consisting of:
a first blend containing:
5 to 17% lauric acid C12:0,
34 to 45% palmitic acid C16:0,
4.5 to 7.5% stearic acid C18:0,
25 to 35% oleic acid C18:1, and
a remainder of a second blend of fatty acids C4:0 to C22:0; and
a third blend of emulsifiers; and
wherein the trans-fat isomers free fat base has a solids profile of:
N10 between 50 and 80%,
N20 between 30 and 50%,
N30 between 10 and 20%,
N35 between 5 and 15%, and
N40 less than 5%.

3. A trans-fat isomers free fat base consisting of:
a first blend containing:
5 to 17% lauric acid C12:0,
34 to 45% palmitic acid C16:0,
4.5 to 7.5% stearic acid C18:0,
25 to 35% oleic acid C18:1, and
a remainder of a second blend of fatty acids C4:0 to C22:0; and
a third blend of emulsifiers; and
wherein the trans-fat isomers free fat base has a solids profile of:
N10 between 55 and 72%,
N20 between 35 and 48%,
N30 between 14 and 18%,
N35 between 6 and 10%, and
N40 less than 3%.

* * * * *